United States Patent
Yadav et al.

(10) Patent No.: US 9,367,803 B2
(45) Date of Patent: Jun. 14, 2016

(54) PREDICTIVE ANALYTICS FOR INFORMATION TECHNOLOGY SYSTEMS

(71) Applicant: Tata Consultancy Services Limited, Mumbai, Maharashtra (IN)

(72) Inventors: Reena Dayal Yadav, Lucknow (IN); Atanu Kumar Roy, West Bengal (IN); Udayan Singh, Uttar Pradesh (IN); Safia Chisti, Uttar Pradesh (IN); Sanjeev Kumar, Uttar Pradesh (IN); Ankur Srivastava, Uttar Pradesh (IN); Parthasarathy Dey, Uttar Pradesh (IN)

(73) Assignee: Tata Consultancy Services Limited, Maharashtra (IN)

( * ) Notice: Subject to any disclaimer, the term of this patent is extended or adjusted under 35 U.S.C. 154(b) by 150 days.

(21) Appl. No.: 13/890,597

(22) Filed: May 9, 2013

(65) Prior Publication Data

US 2013/0318022 A1    Nov. 28, 2013

(30) Foreign Application Priority Data

May 9, 2012    (IN) .......................... 1426/MUM/2012

(51) Int. Cl.
*G06N 5/02*    (2006.01)
*G06Q 10/00*    (2012.01)

(52) U.S. Cl.
CPC . *G06N 5/02* (2013.01); *G06Q 10/00* (2013.01)

(58) Field of Classification Search
CPC ..................................................... G06N 5/04
USPC ........................................................ 706/47
See application file for complete search history.

(56) References Cited

U.S. PATENT DOCUMENTS

| | | |
|---|---|---|
| 5,461,699 A | 10/1995 | Arbabi |
| 8,327,442 B2 | 12/2012 | Herz |
| 2011/0004565 A1* | 1/2011 | Stephenson et al. .......... 705/348 |

FOREIGN PATENT DOCUMENTS

| | | |
|---|---|---|
| EP | 1291772 A2 | 3/2003 |
| EP | 2318891 A1 | 5/2011 |

OTHER PUBLICATIONS

Alan Lundberg ("Leverage Complex Event Processing to Improve Operational Performance" Business Intelligence Journal • vol. 11, No. 1, 2006).*
Jiang et al ("Intelligent Cloud Capacity Management" Apr. 16, 2012).*
Cavallo et al ("An Empirical Comparison of Methods to support QoS-aware Service Selection" May 2010).*
Bernhard Pfaff ("VAR, SVAR and SVEC Models: Implementation Within R Package vars" Jul. 2008).*

(Continued)

*Primary Examiner* — Lut Wong
(74) *Attorney, Agent, or Firm* — Hayes Soloway, P.C.

(57) ABSTRACT

Disclosed is a method and apparatus for organizing, correlating IT management data in batch mode as well as real time and doing predictive analytics to indicate possible threshold breaches, possible failures and usage bottlenecks in the systems in an information technology (IT) environment. The system and method further predicts the state of the information technology (IT) system components systematically based on current and past system states and system component states, overall systemic behavior, known system behavioral rules and load conditions/usage characteristics.

18 Claims, 7 Drawing Sheets

(56) References Cited

OTHER PUBLICATIONS

Wayne W. Eckerson, "Extending the Value of Your Data Warehousing Investment, First Quarter 2007 TDWI Best Practices Report" Data warehousing Institute.

Ross Maciejewski, Ryan Hafen, Stephen Rudolph, Stephen G. Larew, Michael A. Mitchell, William S. Cleveland, David S. Ebert "Forecasting Hotspots—A Predictive Analytics Approach" Journal of Latex Class Files, vol. 6, No. 1, Jan. 2007.

"Predictive Analytics in Communication Systems" Context-Based 4casting ("C-B4") Ltd.

* cited by examiner

PREDICTIVE ANALYTICS FOR INFORMATION TECHNOLOGY SYSTEMS

TECHNICAL FIELD

The present subject matter described herein, in general, relates to managing systems in an information technology environment, and more particularly to a system and method for managing system performance in real time by performing predictive analytics to indicate possible threshold breaches, failures and usage bottlenecks of the system in an information technology environment.

BACKGROUND

In a computing environment, system monitoring, establishing correlations and organizing systems constitutes an important task to improve overall performance of the system in information technology (or data processing) environment. In general, the system comprises of a plurality of hardware and software components. As the systems grow large and complex, the interactions between the hardware and software components become hard to maintain and manage or even trust. Any failure in the system may cause the system to freeze, reboot, or stop functioning altogether that may lead to data loss.

Existing systems do monitoring or correlation or rule based analysis of the data, but in isolation. Further, still many applications use manually set thresholds to discover Service Level Agreement (SLA) violations or to approach violations and to issue alters regularly. However, none of these systems simultaneously use a rule based analysis, correlation and statistical analysis to predict possible system failures, SLA and threshold violations.

Predictive analysis identifies risks and failures by statistical analysis by extracting present and historical information from data and using it to predict future trends and behavior patterns. The analysis is vital for system monitoring purposes.

Some of the tools known in prior art are: IBM Tivoli Monitoring software that helps in optimizing IT infrastructure performance and availability beside detecting and recovering potential problems in essential system resources automatically. PRTG is a network-monitoring tool that ensures smooth running of computer systems are running smoothly with minimal or no outrages at all.

Various built-in command and a few add-on tools are known in prior art equipped with tons of monitoring. These tools provide metrics, which can be used to get information about system activities. These tools can be used to find the possible causes of a performance problem.

However, the above-discussed tools exist in their own silos and are not associated in a meaningful and usable manner. None of these systems uses the behavior of the current IT environment as a parameter to predict these violations. These systems thus fail to acknowledge the impact of the change in environment on the behavior of the system and the correlated change in predictive patterns; hence the prediction itself.

Thus, in the light of the above-mentioned challenges, it is evident that, there is a need for a system and method to predict systematically the state of the information technology (IT) system components based on current and past system states and system component states, overall systemic behavior, known system behavioral rules and load conditions/usage characteristics.

SUMMARY

This summary is provided to introduce aspects related to apparatus and methods for computation and processing of an image for image matching and the aspects are further described below in the detailed description. This summary is not intended to identify essential features of the claimed subject matter nor is it intended for use in determining or limiting the scope of the claimed subject matter.

In one implementation, a method for predicting system behavior in an information technology environment in real time is depicted. Firstly, a stream of data that is representative of plurality of statistical parameters governing the system behavior is received and stored. Such receiving and storing of data is performed for a predetermined period. Next, a set of pre-stored rules are applied along with associated threshold values to the plurality of statistical parameters such that a deterministic pattern is obtained of the system behavior. Based upon the deterministic pattern obtained from the analysis of the statistical parameters, a statistical model is constructed. In one aspect, the plurality of statistical parameters is continuously analyzed for detecting any deviation from the deterministic pattern of the system behavior in a way not occurred earlier. Now, once any deviation in pattern is detected, the pre-stored rules, the associated threshold values and the statistical model are updated dynamically. Based upon the analysis, the system behavior is predicted based upon dynamically updated rules, the threshold values and the statistical model.

In another aspect, a system for predicting system behavior in an information technology environment is presented. The system broadly comprises of a receiving module that is configured to receive and store a stream of data representative of plurality of statistical parameters governing the system behavior for a period of time. Next, an analytics engine further comprises of a pattern recognition module that is configured to apply pre-stored rules along with associated threshold values to the plurality of statistical parameters such that a deterministic pattern is obtained of the system behavior is obtained. The analytics engine further comprises of a modeler that is configured to construct a statistical model based on the deterministic pattern obtained from the statistical parameters of the stream of data received and stored over the period of time. The system further comprises of a feedback module that is configured to iteratively analyze the plurality of statistical parameters for detecting any deviation from the deterministic pattern of the system behavior. In response to the detecting of any deviation, the feedback module interacts with the analytics engine to update dynamically the pre-stored rules, the associated threshold values and the statistical model. Finally, a forecasting module predicts the system behavior based upon the dynamically updated rules, the threshold values and the statistical model.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
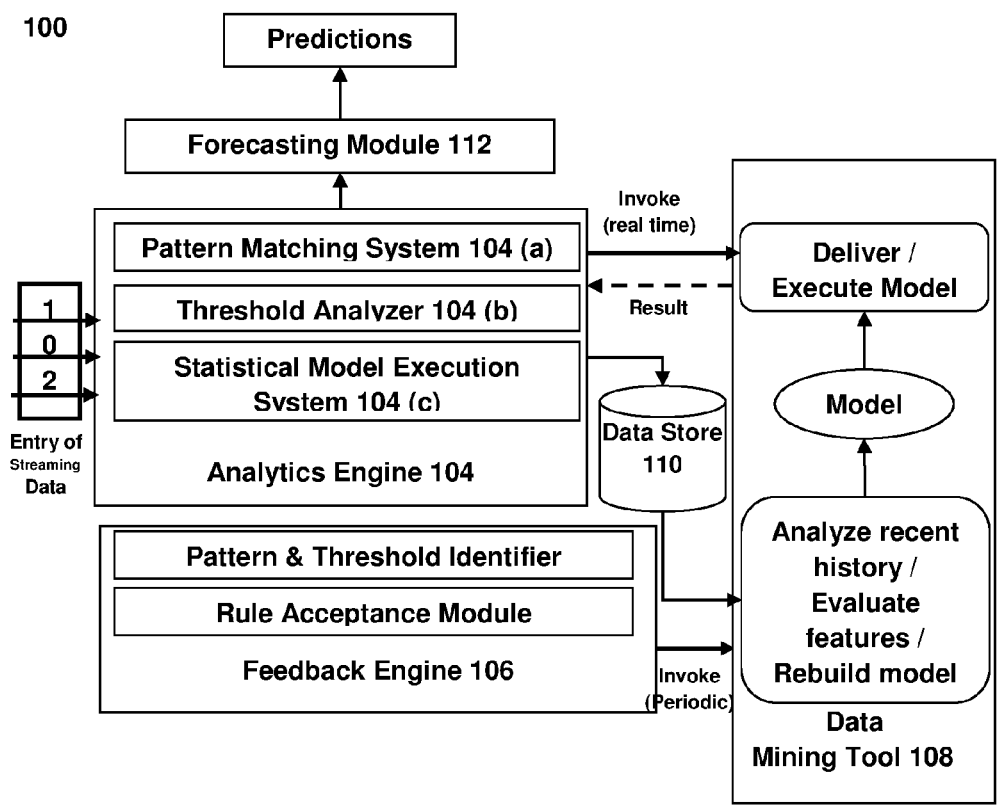
FIG. 1 is a block diagram that illustrates inter-connection between elements of the system, in accordance with an embodiment of the present subject matter.

Systems and methods for predicting analytics of the system performance in an information technology environment are described.

In one example, the present subject matter discloses a system and method to predict systematically the state of the information technology (IT) system components based on current and past system states and system component states, overall systemic behavior, known system behavioral rules and load conditions/usage characteristics.

In one implementation, the present subject matter discloses a system and method that receives data from live information technology (IT) systems as inputs; analyze the data and accordingly predict the performance, capacity and functional integrity of the system. The disclosed system and method may be used in IT Systems managing environments, pertaining to different Industries, such as Banking & Financial Services, Energy, Resources & Utilities, Government, High Tech, insurance, Life Sciences, Manufacturing, Media & Information Services, Retail & Consumer Products, telecommunications, Travel, Transportation & Hospitality, healthcare, pharmaceuticals and other industry to predict possible system failures, service level agreement and threshold violation.

Broadly, the system of the present subject matter follows two stages in the deployment cycle. In the initial stage, the environment specific learning are used to train the system and the configuration setups, based upon which the threshold setups are defined. During the initial phase, the rules that are defined for training the system are applied along with the associated threshold values, on the data that has been received, in order to derive a deterministic pattern of the incoming data. At this stage, the statistical fitment of the system parameters is analyzed using techniques like time series analysis viz Autoregressive Moving Average (ARMA), Autoregressive Integrated Moving Average (ARIMA) Models, multivariate time series analysis viz Vector Autoregressive (VAR) Models, Vector Error Correction Models (VECM), Structural VAR (SVAR) etc and not limiting to neural networks, and the environment impact on some of these critical parameters is evaluated in order to derive a statistical model.

Next, once the system is configured with a statistical model, the system continues to receive and analyze the incoming data to make predictions of possible failures or bottlenecks of the system. Any variations in the environment are captured as changes in the system parameters that eventually leads to understanding and creation of new deterministic patterns of overall system behavior. In one preferred embodiment, the system maintains a feedback loop that analyzes the changes and is activated to record pattern changes in the incoming data. These changes in patterns are then assessed by the feedback module to decide if the changes in pattern are substantial to constitute a change in pre-stored rules and associated thresholds.

While aspects of described apparatus and method for predicting system behavior within a technological environment may be implemented in any number of different computing apparatus, environments, and/or configurations, the embodiments are described in the context of the following exemplary apparatus.

Referring now to FIG. 1, a system 100 for predicting behavior of the system within an information technology environment is depicted. Broadly, the system 100 preferably comprises of a receiving module 102 that is configured to receive a stream of data that is embedded with various attributes. These attributes are identified for a sub set of attributes based upon the domain knowledge such that these sub set of attributes are treated as plurality of statistical parameters governing the system behavior. The statistical parameters that may govern the system behavior may vary across with the nature of receiving data, the domain, specific technology environment and solution. The data hence can be representative of diagnostic, configuration and behavioral information of different components of the IT environment like database, storage, application, network etc.

The system 100 further comprises of an analytics engine 104 that is configured to receive a stream of data from the receiving module 102 for analysis of statistical parameters associated with the data. The analytics engine 104 further comprises of a pattern recognition module 104(a) that is configured to detect patterns from the input data and store it as standard deterministic pattern. Any data that is then needs to be analyzed shall be compared by the pattern recognition module 104(a) with the stored deterministic pattern to detect any deviation or changes in the pattern that may have an impact, either desirable or undesirable, on the system behavior.

Once the data is assessed for a deterministic pattern, a threshold analyzer 104(b) tracks the counters and the observed patterns against the predetermined threshold values. As discussed above, these threshold values are determined along with the pre-stored rules that are pre-defined to address and govern general information technological environment as well as the environment specific learning or solution.

The analytics engine 104 further comprises of a modeler 104(c) that is entrusted with a task to perform statistical analysis of the incoming data based upon the pattern generated over a period. It shall however be noted that the modeler 104(c) performs statistical analysis over the pattern derived from statistical parameters that have been associated with a historical data that has been assessed for a predetermined period. The historical data, the derived rules (rules conforming to the industry standards as well as those designed for a specific target environment) and the pattern is stored in a data store 110, as shown in FIG. 1. Additionally, the modeler 104(c) is configured to execute the statistical model to enable predicting the system behavior based upon the results/feed/of the data store 110.

The system 100 of the present invention, in addition, comprises of a feedback module 106 for continuous learning of the system behavior in order to ensure optimized prediction in real time. The feedback module 106 involves a pattern and threshold identifier 106(a) that performs continuous analysis of the live data to identify for any new patterns or to detect or derive changes in the threshold values associated with the pre-stored rules. Further, the feedback module 106 employs a rule acceptance module 106(b) that executes pluggable rules to check the relevance of different aspects of the predictive algorithm under the current load or environment conditions, and automatically adapts the rules and the associated threshold values to the changes, if any.

Re-referring to FIG. 1, the system 100 is configured to employ a data analysis tool 108 that analyses the historical data stored in the data store 110, evaluate features or statistical parameters associated with the data, regenerate the modeler 104(c), if needed to execute the model and eventually predict the system performance. The forecasting module 112 is a decision making body of the system 100 that is responsible for rolling out the predictions based upon the output of the different components of the analytics engine 104 and/or the feedback module 106.

Although the present subject matter is explained considering that the system 100 is implemented as a system on a server, it may be understood that the system 100 may also be implemented in a variety of computing apparatuses, such as a laptop computer, a desktop computer, a notebook, a workstation, a mainframe computer, a server, a network server, and the like.

The system 100 provides a generic solution that accommodates plurality of pluggable analytics modules. These modules provide auto-learning capability to study the changes in the information technology environment, usage pattern and the pre-stored rules and the statistical model(s) seamlessly with or without manual intervention. The statistical model constructed as a solution to predict the future system behavior is platform independent and hence can be built upon or deployed on any platform. The system 100 is capable of accepting and executing new, updated, or regenerated statistical models dynamically in real time.

Figure 2:
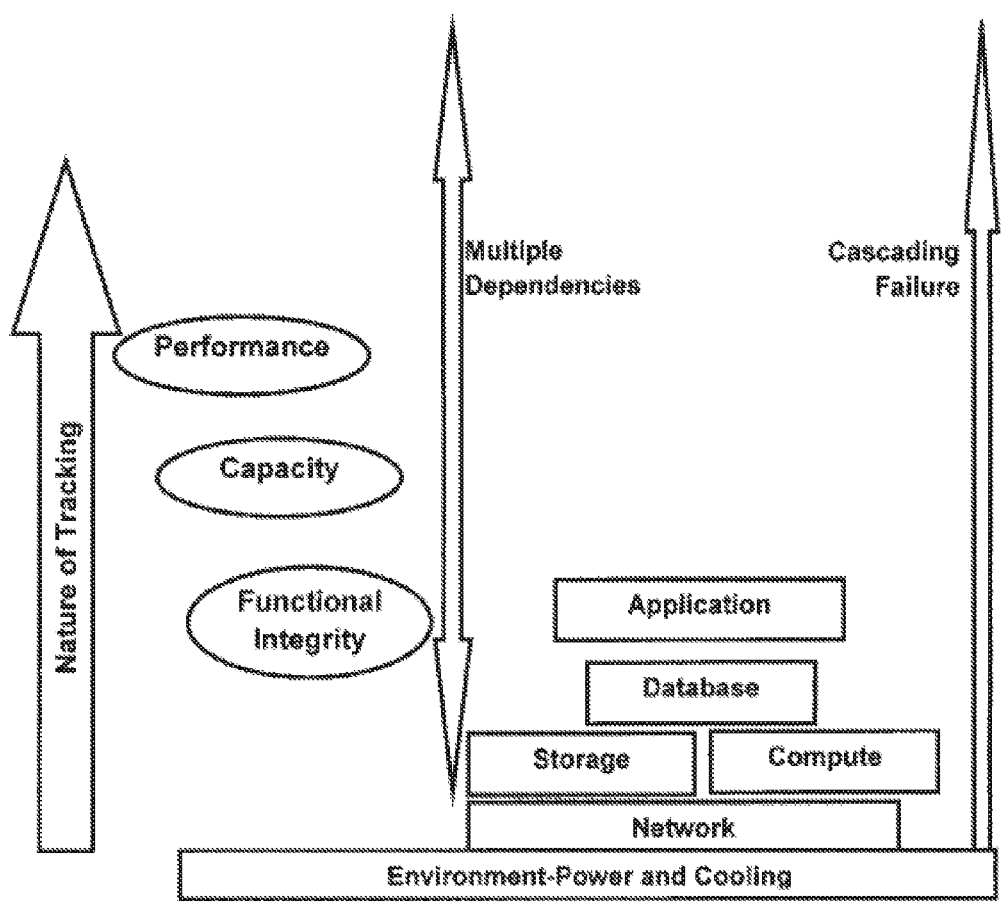
FIG. 2 illustrates simplified schematic diagram of the system showing system dependencies, in accordance with an embodiment of the present subject matter.

Referring now to FIG. 2, the system 100 is illustrated in accordance with an embodiment of the present subject matter, wherein various constituting components of the system are depicted along with their multiple inter-dependencies and the nature of their cascading failure from bottom to top. In one embodiment, the system 100 may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system 100 to interact with a user directly or through the client devices. Further, the I/O interface may enable system 100 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and data.

The modules include routines, programs, objects, components, data structures, etc., which perform particular tasks or implement particular abstract data types. In one implementation, the modules may include a receiving module 102, an analytics engine 104, a feedback module 106, a forecasting module 112 and other modules. The other modules may include programs or coded instructions that supplement applications and functions of system 100.

The data store 110, amongst other things, serves as a repository for storing data processed, received, analyzed and generated by one or more of the modules. The data store 100 may include data generated because of the execution of one or more modules in the other module.

Re-referring to FIG. 2, the three major aspects based upon which the system behavior is adjudged are shown as system performance, system capacity and the functional integrity of the system. As shown in FIG. 2, the IT eco-system health is dependent on several parameters such as environmental factors (like power and cooling), compute, network, storage, database, application and the like. All these parameters may function well independently as well as may affect each other. For example, considering the nature of cascading failure from bottom to top, it can be understood that a failure in network will definitely lead to a failure in application but not vice versa.

The behavior of an IT system may be influenced by many variables like capacity and quality of the deployment environment, health of the hardware and software, load on the system etc. These variables could be subjected to change with time due to various reasons like capacity addition of some hardware component, newer software patches, seasonal changes leading to spikes in usage pattern and data volume etc. So, any attempt to predict the behavior of the IT system requires consideration of an initial circumstance(s) that may be existing at the time of deployment, and the evolving circumstances that requires further effective consideration in order to make the system more effective, robust and dynamic.

Figure 3:
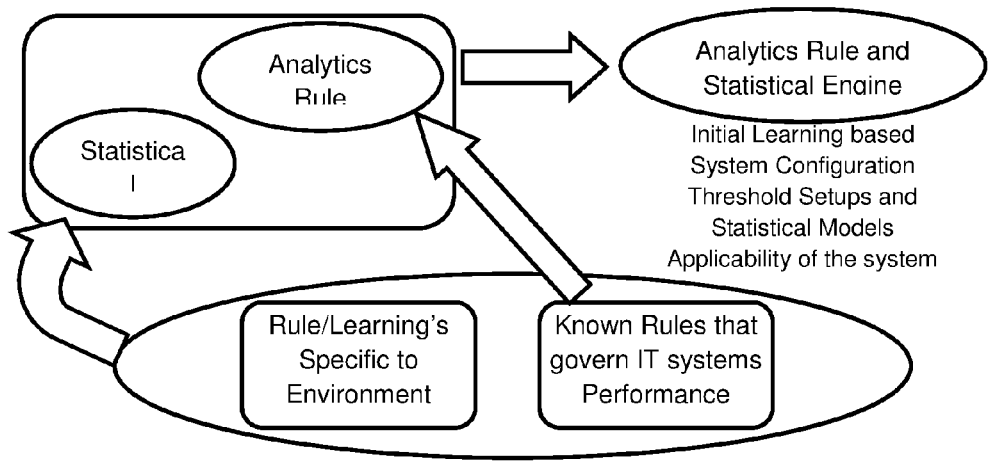
FIG. 3 illustrates an exemplary view of the system in initial learning phase, in accordance with an embodiment of the present subject matter.

The former situation wherein the initial learning phase of the system is studied and recorded is explained in FIG. 3, while the later is referred as online monitoring and analysis phase is explained in FIG. 4. Referring to FIG. 3, the system 100 is shown to record a set of predefined rules along with threshold values. These rules are either drawn from the rules that are known to govern the performance of the IT systems in the industry, and are generally known; or are custom made as a requirement to provide an environment specific solution. The analytics engine 104 and the modeler 104(c) access these rules in particular, to apply them upon the statistical parameters that are associated with the stream of data received as an input to the system 100. In response to the applied rules, the system is trained; the configurations are set up and the threshold values derived/defined, which are eventually used to derive a deterministic pattern of the recorded data. During this phase, the statistical fitment of the system parameters is assessed and their impact on some of the system's critical parameters evaluated.

Figure 4:
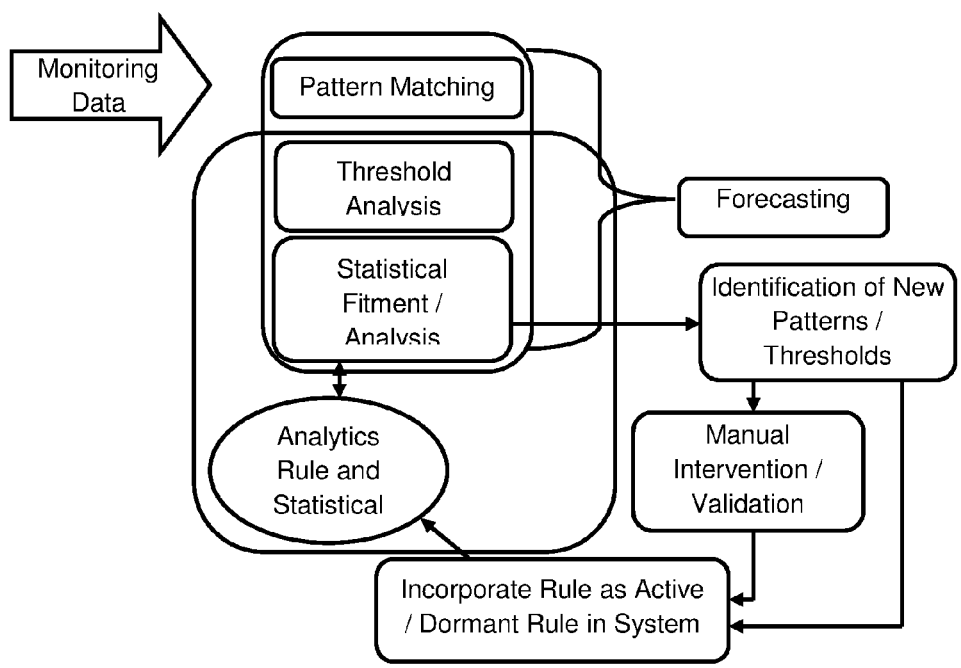
FIG. 4 illustrates an exemplary view during real time monitoring and analysis phase of the system, in accordance with an embodiment of the present subject matter.

In another implementation, shown in FIG. 4, a online monitoring and analysis phase is shown wherein the data is continuously monitored by the system 100. As shown, the data is first received and transmitted to the analytics engine 104 that employs various constituting modules viz-a-viz pattern recognition module 104(a), threshold analyzer 104(b) and the modeler 104(c). In one example, the analytics engine 104 may interact with the feedback module 106 for identification of new patterns or thresholds in order to regenerate the applicable rules. This may however require a manual intervention wherein the user validates if the changes observed in the pattern are pertinent enough to alter or revise the existing rules.

Alternately, the system can be trained to detect any deviation in pattern, decide whether the changes in the pattern are integral to the system based on some predefined priorities, and then make changes to the rules upon confirmation. The system 100 is trained to perform as an intelligent system that is enabled to attach from a previous interactions between the system components, the nature of data, significance attached to the data and from similar aspects, the priority to each statistical parameter governing the system behavior. Such a prioritization may render the system capable to assess if the changing scenario and changing system behavior demands a change in applicable rules. Accordingly, the rules are incorporated either ad active rules or dormant rules in the system 100.

Figure 5:
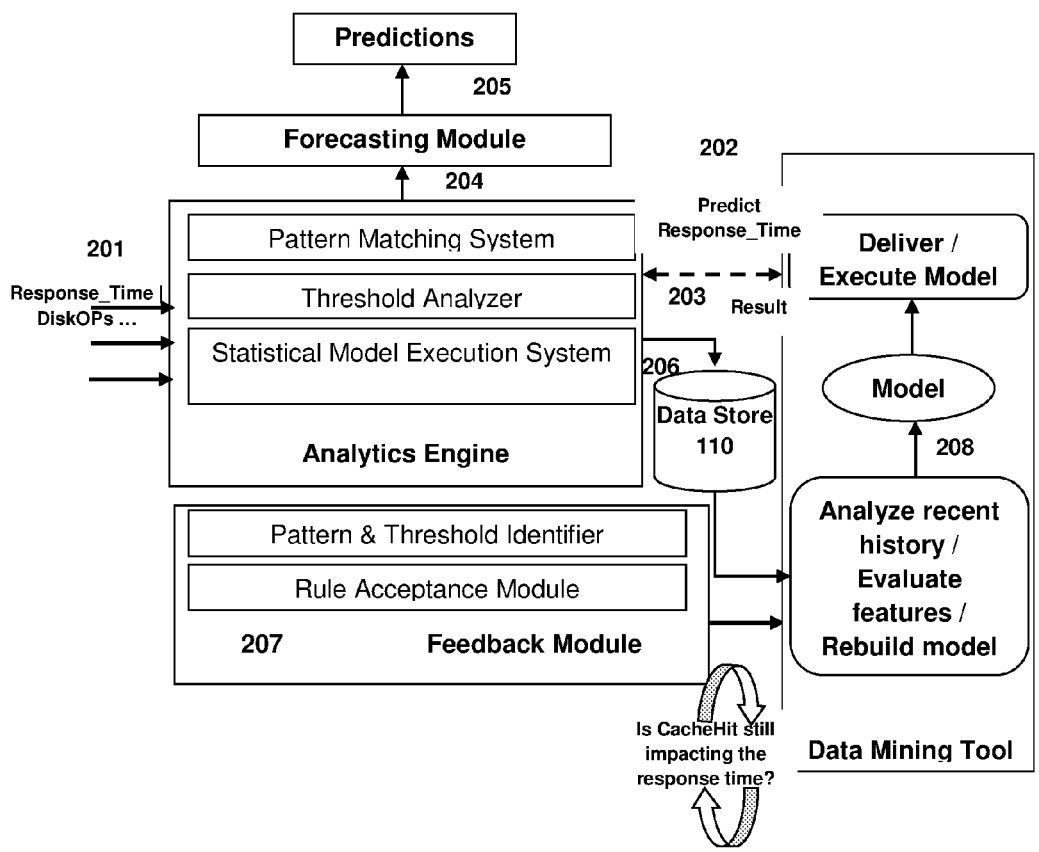
FIG. 5 is a flowchart illustrating steps involved in performing real time predictive analytics by the system, in accordance with an embodiment of the present subject matter.

The detailed description of the overall process in the system 100 and its constituting components/modules, and in the memory is explained in FIG. 5.

As shown in FIG. 5, the receiving module 102 receives the raw data from multiple sources, shown in 201 for a predefined period. Such data is associated with multiple attributes, from which the sub set of attributes are derived based upon the domain knowledge. These attributes are treated as plurality of statistical parameters; say for example, response time, disk IOPs, cache hit, utilization, service time, total throughput, bandwidth, request size etc. Assuming that the statistical model has been constructed by the system 100 that is available for execution and hence to predict results. Once the data is received, it is fed as an input to the model that is executed to predict the aspects of system parameter-performance, system capacity and system's functional integrity, as shown in 202. The predicted result is stored and analyzed by the analytics engine 104 to derive a deterministic pattern of the historical data and the associated threshold values, (shown in 203). The statistical analysis of the data enables determining a pattern using techniques like time series analysis viz Autoregressive Moving Average (ARMA), Autoregressive Integrated Moving Average (ARIMA) Models, multivariate time series analysis viz Vector Autoregressive (VAR) Models, Vector Error Correction Models (VECM), Structural VAR (SVAR) etc and not limiting to neural networks. Based upon the statistical analysis, the statistical model is constructed by the modeler 104(c) (as shown in 204) . . . . The forecasting module 112 then predicts the possible system behavior, system failure or other bottlenecks based on the statistical analysis and the statistical model, as shown in step 205.

The data is collected and stored in data store 110 for a significant period so that more reliable and effective pattern can be drawn therefrom (as shown in 206). In a preferred embodiment, the feedback module 106 of the system 100 utilizes pattern and threshold identifier module 106(a) and the rule acceptance module 106(b) to identify deviation in existing pattern and to assess if the change in pattern is pertinent enough to substantiate change in the pre-stored rules, as shown in step 207. For example, if the feedback module 106 is assessing the statistical parameters, and amidst the stored parameters, the module 106 determines that the cache hit is no more influencing the response time of the system to a measurable extent, it may be recorded by the system 100. The data-mining tool 108 may then analyze it further to assess its significance. If the cache hit is reported to become insignificant in the recent operations, that have now become Write Heavy, the system may make the rules associated with cache-hit parameter of the data as a dormant rule, and may accordingly change the threshold values, and consequently the statistical model, as shown in step 208.

Figure 6:
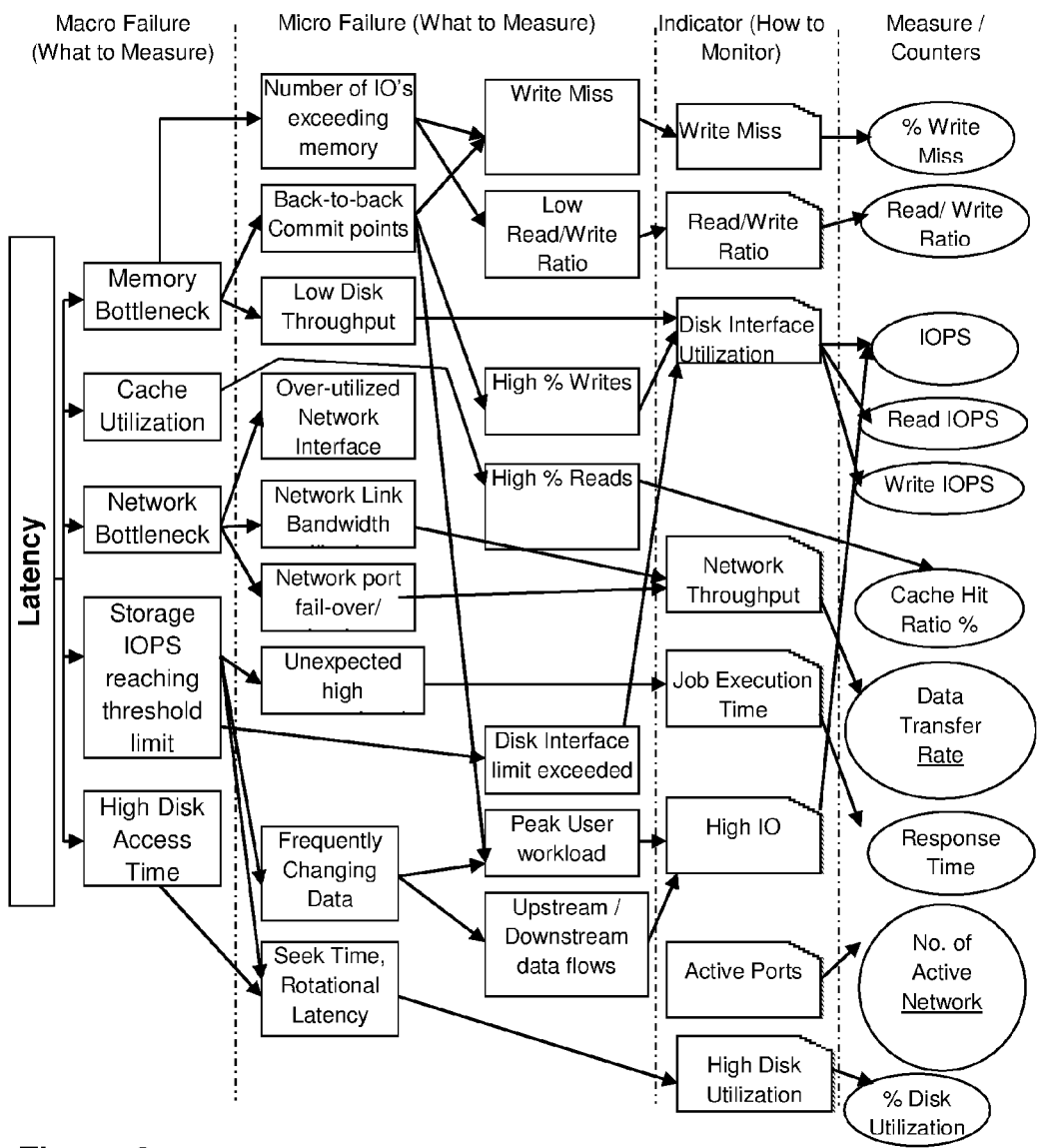
FIG. 6 illustrates an exemplary view of the system performance, in accordance with an embodiment of the present subject matter.
Figure 7:
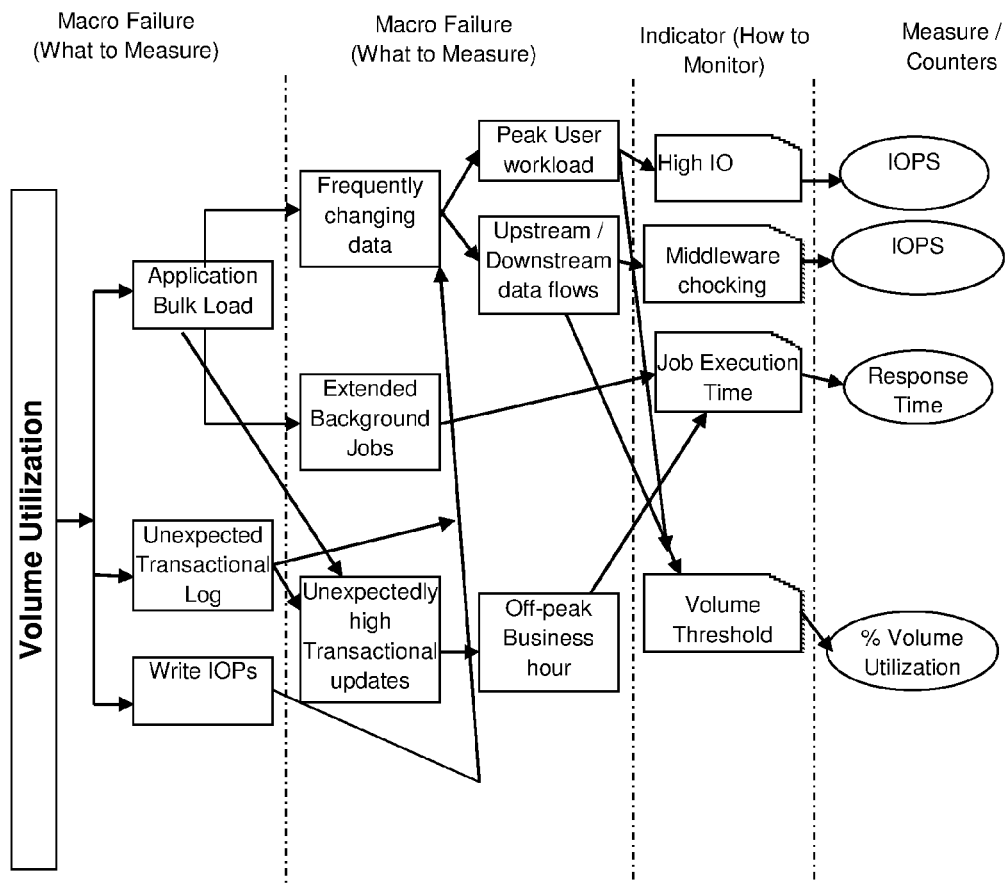
FIG. 7 is an exemplary illustration of volume utilization of the system, in accordance with an embodiment of the present subject matter.
Figure 8:
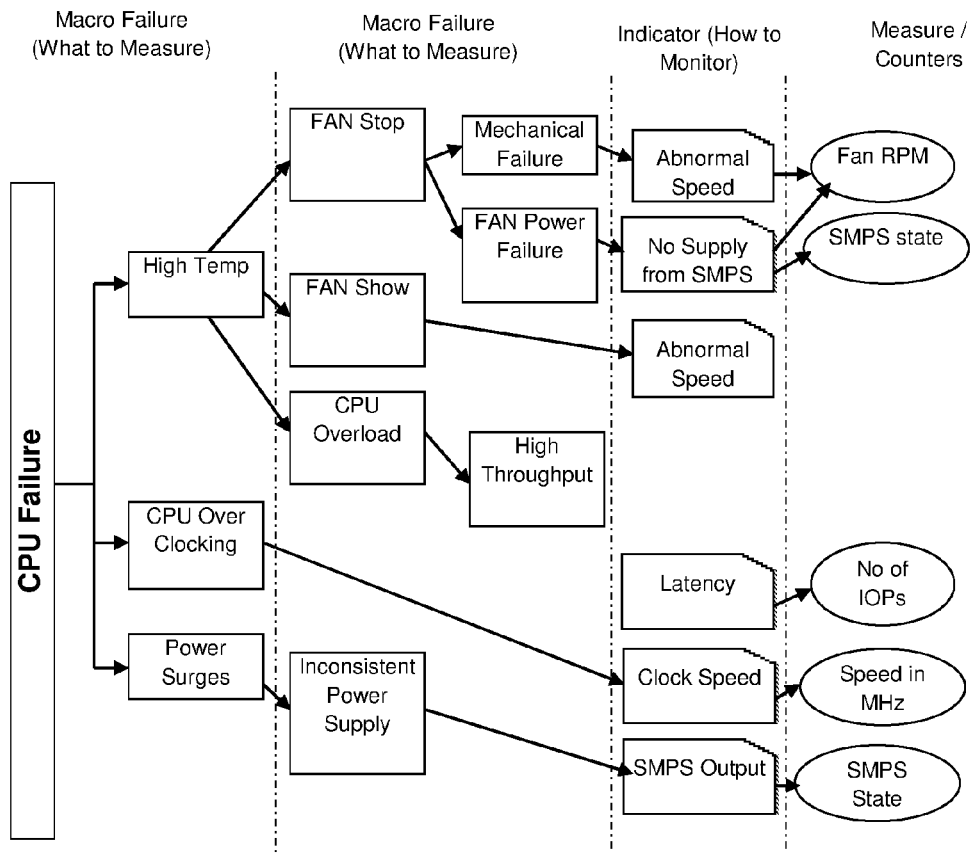
FIG. 8 is an exemplary illustration of processing efficiency of the system, in accordance with an embodiment of the present subject matter.

In one implementation, and referring to FIGS. 6, 7 and 8 an exemplary view of the system 100 implemented in a storage scenario is presented where on the three layers of analysis for IT (performance/capacity/functional integrity) details are presented on storage.

Referring to FIG. 6, latency aspect of the system 100 is analyzed. The Figure shows the micro/macro failures related to the latency aspect along with the parameters to monitor the same. While in one example, the macro failures that need to be measured can be projected as memory bottleneck, cache utilization, network bottleneck, storage IOPS reaching threshold limit and High disk access time; the micro failures can be Number of IOs exceeding memory, back to back commit points, low disk throughput, over-utilized network interface, network link bandwidth utilization, network port fail-over/redundancy, unexpectedly high transactional update, frequently changing data and seek time and rotational latency. Next shown is a column listing various indicators that needs monitoring such as write miss, read/write ratio, disk interface utilization, network throughput, execution time, high IO, active ports etc, in order to reflect micro failures. Lastly shown are the measures or counters expressed in percentages, which is generally diagnostic information reflecting performance of system in terms of latency.

Next in FIG. 7, volume utilization of the storage has been analyzed. Again the macro failures are analyzed viz. application bulk load, unexpected transactional log, write IOP's along with micro failures such as frequently changing data, extended background jobs, unexpectedly transactional updates. The macro and micro failures are mapped to establish an inter-connect between the two. The indicators such as High IO, middleware choking, job execution time and volume threshold are reflective of micro failures that need to be monitored. The last column on the right, indicates the measures/ counters such as IOPs, response time volume utilization % and the like which represent statistical parameters of the data that needs to be analyzed to predict capacity of the system.

FIG. 8 is a depiction of CPU failure analysis, where again the macro failures like high temperature, CPU over clocking and power surges are captured along with the micro failures like Fan stop, Fan slow, CPU overload, inconsistent power supply, and a mapping is performed between the two. Now the indicators of these failures like abnormal speed, no supply from SMPS, latency, clock speed, SMPS output are monitored to find the cause of these micro failures. Finally, the counters/measures such as FAN RPM SMPS state, No. of IOPs, Speed in MHz reflective of statistical parameters are recorded that are lately analyzed to predict functional integrity of the system.

Thus overall scenario on storage can be shown as in Table 1 given below:

| Performance | % age Write Miss, No. of Read IOPS, No. of Write IOPS, Cache Hit Ratio (%), Data Transfer Rate (MB/s), Disk Response Time, No. of Active Network Ports, Disk Utilization, Spindle Count, RAID Configuration, Disk Type | Latency |
|---|---|---|
| Capacity | No. of IOPS, Disk Response Time, % Volume Utilization | Volume Utilization |
| Functional Integrity | Fan RPM, SMPS State, No. of IOPS, Clock Speed, Static Charge | CPU Failure |

In one implementation, the scenario based upon which the data is generated is discussed hereafter.

In the first set of scenario, the % Read Access, % Random access and the load is varied, wherein the load is increased after every 2 (two) minutes. All other factors, such as RAID Level, No. of Disks, Disk Type and No. of Active Network Ports have been kept constant. No. of Threads are increased from 0-100; whereas % Read Access/% Random Access are decreased from 100% to 10%.

Multiple approaches for deriving the "Statistical Fitment Modeller" are then utilized, some of them being:
 a) Time Series Analysis
 b) Multiple Regression Analysis
 c) Multivariate Time Series Analysis
 d) Neural Networks Now for assessing the performance in terms of latency, statistical model based on multivariate time series (VAR) analysis is developed upon the average response time parameter.

Here Avg. Response Time is a F(x) of # Total IOPS; Disk Resp Time; Vol Utilization; Cache Further, it should be understood that VAR models (vector autoregressive models) are used for multivariate time series.

The structure is that "Avg Response Time" is a linear function of past lags of itself and past lags of the other variables i.e. Total IOPS, Disk Response Time, Volume Utilization and Cache; and deterministic terms (constant, trend, both, none).

The steps that are implemented in VAR analysis comprises:
 a) Augmented Dickey-Fuller (ADF) Test for Stationarity*of Series—A stationary process has the property that the mean, variance and autocorrelation structure do not change over time.
 b) Lag Length Selection is then employed using Akaike Information Criterion (AIC), Bayesian Information Criterion (BIC) etc.
 c) Granger Causality Test—wherein if a variable, or group of variables, y1 is found to be helpful for predicting another variable, or group of variables, y2 then y1 is said to Granger-cause y2; otherwise it is said to fail to Granger-cause y2
 d) Constructing a VAR Model
 e) Predicting based upon the constructed model A general VAR equation for Avg Reponse Time in this case is of the following format:

$$\text{Avg\_Rsp\_Time} = $$
$$\alpha 1 \text{Avg\_Rsp\_Time}.l1 + \beta 1 \text{Disk\_Rp}.l1 + \gamma 1 VolUt.l1 + \delta 1 TotIOPS.l1 +$$
$$\lambda 1 Cache.l1 + \alpha 2 \text{Avg\_Rsp\_Time}.l2 + \beta 2 \text{Disk\_Rp}.l2 + \gamma 2 VolUt.l2 +$$
$$\delta 2 TotIOPS.l2 + \lambda 2 Cache.l2 + \ldots + \alpha i \text{Avg\_Rsp\_Time}.li + \beta i \text{Disk\_Rp}.li +$$
$$\gamma i VolUt.li + \delta i TotIOPS.li + \lambda i Cache.li + \ldots + \alpha k \text{Avg\_Rsp\_Time}.lk +$$
$$\beta k \text{Disk\_Rp}.lk + \gamma k VolUt.lk + \delta k TotIOPS.lk + \lambda k Cache.lk$$

where Avg_Rsp_Time.li, Disk_Rp.li, VolUt.li, TotIOPS.li, Cache.li are the ith lag of Avg Response Time, Total IOPS, Disk Response Time, Volume Utilization and Cache;

and Avg_Rsp_Time.lk, Disk_Rp.lk, VolUt.lk, TotIOPS.lk, Cache.lk are the kth (value determined through the step Lag Length Selection) lag of respective variables.

This VAR equation is then used to predict "Avg Response Time" in future.

Although implementations for method and system for predicting system behavior in an information technology environment have been described in language specific to structural features and/or methods, it is to be understood that the appended claims are not necessarily limited to the specific features or methods described. Rather, the specific features and methods are disclosed as examples of implementations for real time predictive analytics system and method.

We claim:

1. A method for predicting system behavior in an information technology environment in real time by performing predictive analytics, the method comprising:
 receiving and storing, by a processor, a stream of data representative of a plurality of statistical parameters governing a system behavior, for a pre-determined period of time, wherein the system behavior comprises at least one of a performance, capacity, and functional integrity of a computing system, and wherein the plurality of statistical parameters varies based on at least one of receiving data, a domain, and a specific technology environment, and wherein the receiving data is representative of at least one of diagnostic, configuration, and behavioral information of a plurality of components of the information technology environment;
 applying, by the processor, pre-stored rules along with a plurality of associated threshold values to the plurality of statistical parameters such that a deterministic pattern is obtained from the system behavior;
 constructing, by the processor, a statistical model based on the deterministic pattern obtained from the plurality of statistical parameters;
 analyzing continuously, by the processor, the plurality of statistical parameters for detecting a deviation from the deterministic pattern of the system behavior, wherein said analyzing includes identifying new patterns to detect and derive at least one change in the associated threshold rules;
 executing a plurality of pluggable rules to check relevance of the predictive analytics under a current load;
 adapting automatically said plurality of pluggable rules and the associated threshold rules to said at least one change;
 updating dynamically, by the processor at least one of the pre-stored rules, the associated threshold values, and the statistical model based on the deviation; and
 predicting, by the processor, the system behavior based upon at least one of updated data of the pre-stored rules, the associated threshold values, and the statistical model to indicate at least one of a threshold breach, a failure, and a usage bottleneck in the information technology environment, wherein said predicting involves systematic prediction of at least one of current and past system states, a system component state, a system behavioral rule, a load condition, and a plurality of usage characteristics.

2. The method of claim 1, wherein the pre-stored rules comprises at least one of:
 a set of rules governing the system behavior in conformance to industry standards; and
 a set of rules defined for each of specific target environment.

3. The method of claim 1, wherein the deterministic pattern is reformed periodically based upon at least one of:
 a trend of the incoming stream of data and the statistical parameters associated thereto; and an updating of the pre-stored rules and the associated threshold values in response to the detection of a deviation.

4. The method of claim 1, wherein the pre-stored rules are applied based on the associated threshold values, wherein the associated threshold values are predetermined for each of the specific target environment, and adaptive to regenerate each time the system behavior is detected to deviate.

5. The method of claim 1, wherein the statistical parameters are analyzed for a deviation in the system behavior for a predefined period, in order to substantiate updating of the pre-stored rules, the associated threshold values and the statistical model.

6. The method of claim 1, wherein the statistical model is constructed using multivariate time series analysis techniques selected from Vector Autoregressive (VAR) Models, Vector Error Correction Models (VECM), and Structural VAR (SVAR), wherein a VAR model analysis is performed by at least one of an Augmented Dickey-Fuller (ADF) test, a Lag length selection, a granger causality test, construction of a VAR model, and a prediction based upon the constructed VAR model.

7. The method of claim 1, wherein the performance of the computing system depends on at least one factor selected from a group consisting of percentage of write miss, number of read Input/Output Operations Per Second (IOPS), number of write IOPS, cache hit ratio, data transfer rate, disk response time, number of active network ports, disk utilization, spindle count, Redundant Array of Independent Disks (RAID) configuration, and a disk type.

8. The method of claim 1, wherein the capacity of the computing system depends on at least one factor selected from a group consisting of number of Input/Output Operations Per Second (TOPS), disk response time, and a percentage of volume utilization.

9. The method of claim 1, wherein the functional integrity of the computing system depends on at least one factor selected from a group consisting of fan Rotations Per Minute (RPM), Switched Mode Power Supply (SMPS) state, number of Input/Output Operations Per Second (IOPS), clock speed, and a static charge.

10. A system for predicting system behavior in an information technology environment in real time by performing predictive analytics, the system comprising:
a receiving module configured to receive and store a stream of data representative of a plurality of statistical parameters governing a system behavior, for a pre-determined period of time, wherein the system behavior comprises performance, capacity, and functional integrity of a computing system, and wherein the plurality of statistical parameters varies based on at least one of receiving data, a domain, and a specific technology environment, and wherein the receiving data is representative of at least one of diagnostic, configuration, and behavioral information of a plurality of components of the information technology environment;
an analytics engine configured to receive a stream of data from the receiving module for analysis of the plurality of statistical parameters associated with the received stream of data, said analytics engine comprising:
a pattern recognition module configured to apply pre-stored rules along with a plurality of associated threshold values to the plurality of statistical parameters such that a deterministic pattern is obtained from the system behavior and detect a plurality of patterns from an input data and store the plurality of patterns as a standard deterministic pattern;
a threshold analyzer configured to track a plurality of counters and observed patterns against a plurality of predetermined threshold values;
a modeler configured to construct and execute a statistical model based on the deterministic pattern obtained from the plurality of statistical parameters to enable prediction of the system behavior based upon at least one of the results of a data store;
a feedback module configured to analyze the plurality of statistical parameters for detecting a deviation from the deterministic pattern of the system behavior, wherein said feedback module is configured to perform continuous analysis of a live data to identify a plurality of new patterns to detect and derive a plurality of changes in the associated threshold values;
the feedback module interacting with the analytics engine to dynamically update the pre-stored rules, the associated threshold values, and the statistical model based on the deviation wherein the feedback module comprises at least one of a pattern and threshold identifier and a rule acceptance module, said rule acceptance module configured to execute a plurality of pluggable rules to check relevance of the predictive analytics under a current load; and
a forecasting module to predict the system behavior based upon the dynamically updated data of at least one of the pre-stored rules, the associated threshold values, and the statistical model to indicate at least one of a threshold breach, a failure and a usage bottleneck in the information technology environment, wherein said predicting involves systematic prediction of at least one of current and past system states, a system component state, a system behavioral rule, a load condition and a plurality of usage characteristics.

11. The system of claim 10, wherein the analytics engine is configured to define a set of pre-stored rules comprising at least one of:
a set of rules governing the system behavior in conformance to industry standards; and
a set of rules defined for each of specific target environment.

12. The system of claim 10, wherein the pattern recognition module reforms the deterministic periodically based upon at least one of:
a trend of the incoming stream of data and the statistical parameters associated thereto; and
an updating of the pre-stored rules and the associated threshold values in response to the detection of a deviation.

13. The system of claim 10, wherein the modeler constructs the statistical model by employing multivariate time series analysis techniques selected from Vector Autoregressive (VAR) Models, Vector Error Correction Models (VECM), and Structural VAR (SVAR) wherein a VAR model analysis is performed by at least one of an Augmented Dickey-Fuller (ADF) test, a Lag length selection, a granger causality test, construction of a VAR model, and a prediction based upon the constructed VAR model.

14. The system of claim 10, wherein the feedback module analyzes the statistical parameters for a deviation in the system behavior for a predefined period, in order to substantiate updating of the pre-stored rules, the associated threshold values upon coordinating with the analytics engine, and the statistical model upon interacting with the modeler.

15. The system of claim 10, wherein the feedback module coordinates with the analytics engine to regenerate pre-stored rules and the associated threshold values during deviation of the system behavior.

16. The system of claim 10, wherein the performance of the computing system depends on at least one factor selected from a group consisting of percentage of write miss, number of read Input/Output Operations Per Second (TOPS), number of write IOPS, cache hit ratio, data transfer rate, disk response time, number of active network ports, disk utilization, spindle count, Redundant Array of Independent Disks (RAID) configuration, and a disk type.

17. The system of claim 10, wherein the capacity of the computing system depends on at least one factor selected from a group consisting of number of Input/Output Operations Per Second (IOPS), disk response time, and a percentage of volume utilization.

18. The system of claim 10, wherein the functional integrity of the computing system depends on at least one factor selected from a group consisting of fan Rotations Per Minute (RPM), Switched Mode Power Supply (SMPS) state, number of Input/Output Operations Per Second (IOPS), clock speed, and a static charge.

* * * * *